United States Patent
Eglin

(10) Patent No.: US 8,843,252 B2
(45) Date of Patent: Sep. 23, 2014

(54) PILOTING ASSISTANCE METHOD, A PILOTING ASSISTANCE DEVICE, AND AN AIRCRAFT

(75) Inventor: Paul Eglin, Roquefort la Bedoule (FR)

(73) Assignee: Airbus Helicopters, Marignane Cedex (FR)

( * ) Notice: Subject to any disclaimer, the term of this patent is extended or adjusted under 35 U.S.C. 154(b) by 0 days.

(21) Appl. No.: 13/551,021

(22) Filed: Jul. 17, 2012

(65) Prior Publication Data

US 2013/0184902 A1     Jul. 18, 2013

(30) Foreign Application Priority Data

Jul. 27, 2011   (FR) ...................................... 11 02368

(51) Int. Cl.
*G06F 19/00* (2011.01)
*B64C 27/00* (2006.01)
*B64D 45/00* (2006.01)
*G05D 1/06* (2006.01)

(52) U.S. Cl.
CPC .............. *B64D 45/00* (2013.01); *G05D 1/0676* (2013.01)
USPC ......................................... 701/14; 244/17.11

(58) Field of Classification Search
CPC ....... G01C 23/00; G01D 7/00; G01D 1/0676; B64D 45/00
USPC ............................. 701/3, 7, 14, 18; 244/17.11
See application file for complete search history.

(56) References Cited

U.S. PATENT DOCUMENTS

| | | | |
|---|---|---|---|
| 4,004,758 A | 1/1977 | Boriss | |
| 6,255,965 B1 | 7/2001 | D'Orso | |
| 7,089,090 B2 * | 8/2006 | Artini et al. ........................ 701/3 |
| 7,461,548 B2 * | 12/2008 | Toulmay .................... 73/170.02 |
| 7,962,254 B2 | 6/2011 | Bouchet | |
| 2005/0273221 A1 | 12/2005 | Artini | |
| 2008/0208400 A1 | 8/2008 | Bouchet | |
| 2009/0093919 A1 * | 4/2009 | Certain ............................. 701/7 |
| 2010/0036551 A1 * | 2/2010 | Lacaze et al. ................... 701/18 |

(Continued)

FOREIGN PATENT DOCUMENTS

| | | |
|---|---|---|
| EP | 1598720 A1 | 11/2005 |
| FR | 2783500 A1 | 3/2000 |
| FR | 2887065 A1 | 12/2006 |

OTHER PUBLICATIONS

Pratt & Whitney Canada, "PT6A Pilot Familiarization", Aug. 2003, http://rwrpilottraining.com/uploads/3/0/3/7/3037605/pt6_pilot_familiarization.pdf.*

(Continued)

*Primary Examiner* — Fadey Jabr
*Assistant Examiner* — Aaron L Troost
(74) *Attorney, Agent, or Firm* — Brooks Kushman P.C.

(57) ABSTRACT

A piloting assistance device (5) comprising a calculation unit (10) and a display unit (20). The calculation unit (10) executes stored instructions to determine at least one thrust margin for a propeller between a current thrust being exerted by said propeller and a threshold thrust corresponding to a negative power limit (Pmin), and to determine a main minimum total ground slope that can be followed by the aircraft in descent as a function of said thrust margin. Finally, the calculation unit presents a main symbol (25) on a display unit (20), the main symbol (25) representing the minimum total ground slope that can be followed by the aircraft (1) in descent, the main symbol (25) appearing superimposed on a representation (21) of the surroundings that exist in front of the aircraft (1).

16 Claims, 1 Drawing Sheet

(56) References Cited

U.S. PATENT DOCUMENTS

2010/0312421 A1* 12/2010 Eglin .............................. 701/14
2011/0238240 A1* 9/2011 Barral et al. .................... 701/14
2012/0181388 A1* 7/2012 Cowley ........................ 244/175

OTHER PUBLICATIONS

Search Report and Written Opinion; Application No. FR 1102368; dated Dec. 16, 2011.

* cited by examiner

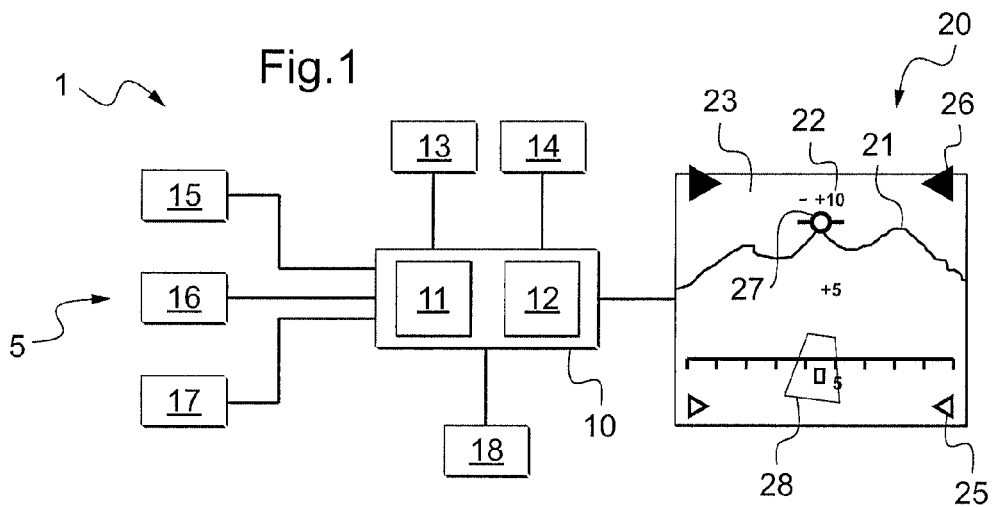
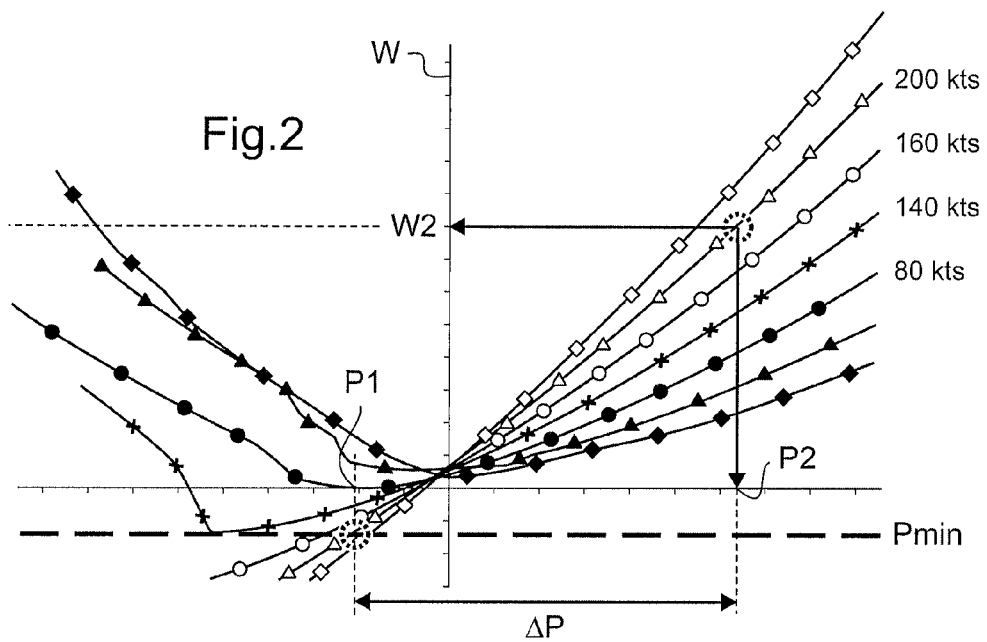
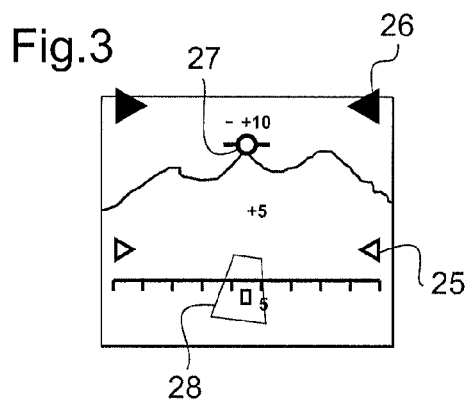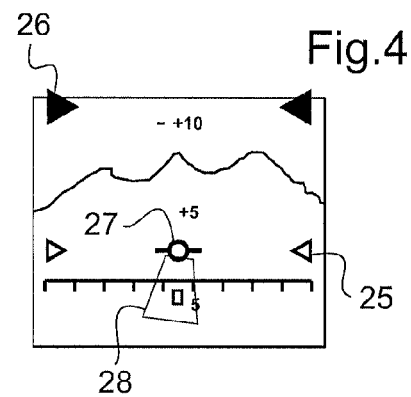

PILOTING ASSISTANCE METHOD, A PILOTING ASSISTANCE DEVICE, AND AN AIRCRAFT

CROSS REFERENCE TO RELATED APPLICATIONS

The present application claims priority to French patent application FR 11/02368 filed on Jul. 27, 2011, the content of which is incorporated in its entirety herein.

BACKGROUND OF THE INVENTION (1) Field of the Invention

The present invention relates to a piloting assistance method, to a piloting assistance device, and to an aircraft having the piloting assistance device.

The invention thus lies in the technical field of instruments for providing assistance in piloting an aircraft, and more particularly a rotorcraft.

(2) Description of Related Art

Document EP 1 598 720 describes a piloting indicator having a calculation unit. The calculation unit displays a symbol on a display screen, the symbol representing a maximum total ground slope for an aircraft, the symbol being superposed on a representation of the relief of the terrain.

It is recalled that the current ground slope of an aircraft represents the angle made by the ground speed vector of said aircraft relative to a horizontal plane, i.e. a plane normal to the direction in which gravity acts. The current ground slope makes it possible to determine the short-term trajectory of the aircraft.

In contrast, the total ground slope of an aircraft serves to predict the long-term trajectory of the aircraft relative to the ground and is a function of the total energy balance of the aircraft. The total ground slope of an aircraft takes account of the instantaneous acceleration on the trajectory of said aircraft.

It should be observed that the term "total air slope" designates the long-term trajectory of the aircraft relative to the mass of air surrounding the aircraft.

Furthermore, aircraft include rotorcraft that are provided with a rotary wing for providing lift, the rotary wing possibly also contributing to propulsion of the rotorcraft.

During a slow descent of a rotorcraft, a dangerous phenomenon referred to as a "vortex state" can appear under certain conditions. This vortex state gives rise to a general loss of lift and maneuverability.

This phenomenon may appear at a vertical air speed of a helicopter that is below a first threshold, and with an air speed in translation that is below a second threshold.

The vortex state is thus dangerous. Nevertheless, a pilot can escape from this vortex state, for example either by beginning to move in translation, or else by increasing the vertical air speed of the aircraft so that the aircraft is no longer in the high-risk flight envelope.

Furthermore, rotorcraft include hybrid aircraft having a rotary wing and also at least one propulsive propeller. The propulsive propeller may generate positive traction, i.e. acting in a direction going from the rear of the aircraft towards the front of the aircraft, or indeed negative traction, i.e. in a direction going from the front of the aircraft towards the rear of the aircraft.

Under such circumstances, the mechanical transmission driving the propeller may be the subject of a limitation, in particular a limitation when the helicopter is exerting negative traction. Such a limitation is referred to as the "negative power limit" for convenience.

This limitation puts a limit on the total ground slope that the aircraft can have in descent.

The following documents are also known: FR 2 783 500 A1, FR 2 887 065 A1, and U.S. Pat. No. 4,004,758 A.

BRIEF SUMMARY OF THE INVENTION

An object of the present invention is thus to propose a method of assisting piloting during descent of a hybrid aircraft.

According to the invention, a method of assisting the piloting of a hybrid aircraft having a rotary wing and at least one propulsive propeller, is remarkable in particular for performing the following steps:

determining at least one thrust margin for the propeller between a current thrust exerted by the propeller and a threshold thrust corresponding to a negative thrust limit authorized on a mechanical transmission driving the propeller;

determining a main minimum total ground slope that can be followed by the aircraft in descent as a function of the thrust margin; and presenting on a display unit a main symbol for the minimum total ground slope that can be followed by the aircraft in descent, this main symbol being a function of at least the main minimum total ground slope and appearing superimposed on a representation of the surroundings existing in front of the aircraft.

The term "surroundings existing in front of the aircraft" designates the surroundings into which the aircraft is heading in forward flight, the representation being either a symbol representing a landing zone, or said landing zone as seen directly by the pilot in a head-up mode.

Thus, the thrust margin represents the maximum deceleration to which the aircraft can be subjected, the main minimum total ground slope being determined as a function of said maximum deceleration. The minimum total ground slope that can be followed by the aircraft is then displayed on a display unit. Depending on this information, the pilot may for example decide whether or not a given landing area can be reached.

The method may include one or more of the following additional characteristics.

In an implementation, in order to determine the thrust margin, the following steps may be performed:

determining the current forward speed of the aircraft;

determining the current power developed by the propeller;

determining the current thrust exerted by the propeller by using a first predetermined database giving the current thrust as a function of the current forward speed and of the current power;

determining the threshold thrust by using a second predetermined database giving the threshold thrust as a function of the current forward speed; and determining the thrust margin, the thrust margin being equal to the difference between the current thrust and the threshold thrust.

Optionally, the forward air speed corresponds to the indicated air speed (IAS) or the true air speed (TAS). Reference may be made to the literature in order to obtain information about means enabling these speeds to be obtained.

Furthermore, the current power may be determined using means for measuring the propeller torque and means for measuring the angular speed of rotation of the propeller.

The first database and the second database may be obtained using thrust/power curves for a propeller at constant forward speed.

For example, a manufacturer performs testing to establish a graph with the thrust exerted by the propeller being plotted along the abscissa axis and the power developed by the propeller being plotted up the ordinate axis. The graph then presents a plurality of curves, each curve being associated with a particular forward speed of the aircraft.

For a given current power and forward speed, it is easy to deduce the current thrust.

It is then easy to construct a database using the graph.

Furthermore, the manufacturer establishes an authorized minimum power. The threshold thrust at a given forward speed then corresponds to the point of intersection between the curve associated with that given forward speed and a straight line parallel to the abscissa axis passing through said authorized minimum power.

The manufacturer can then easily produce the second database.

It should be observed that each database may be a database as such, or any other equivalent means making use of curves or equations, for example.

In another aspect, the aircraft may have a plurality of propellers, each associated with a thrust margin, and the main minimum total ground slope for the approach of the aircraft is determined as a function of the smallest thrust margin.

For example, the aircraft may have two propellers delivering distinct thrusts in order to compensate the torque exerted by the rotary wing on the fuselage of the aircraft. Under such circumstances, a first propeller gives rise to a first thrust margin that is greater than a second thrust margin to which the second propeller gives rise. The main minimum total ground slope is then determined as a function of the smaller thrust margin, i.e. as a function of the second thrust margin in this example.

Furthermore, the main minimum total ground slope may be determined using the following relationship:

$$\gamma_{min} = \gamma - \left( \frac{1}{g} * \frac{1}{m} * \Delta P \right)$$

where "$\gamma_{min}$" represents the main minimum total ground slope, "$\gamma$" represents a current ground slope, "g" represents the acceleration due to gravity, "m" represents the mass of the aircraft, and "$\Delta P$" represents said thrust margin.

In a first implementation, the main symbol illustrates the main minimum total ground slope, the main symbol not being displayed when the aircraft has a forward speed slower than a predetermined limit.

Below the predetermined limit, it is found, surprisingly, that there is no longer any risk of reaching a limit on the mechanical transmission. Under such circumstances, the minimum total slope is no longer limited in this implementation. It is thus possible to inhibit the display of the main symbol.

In contrast, in a second embodiment, it is possible to determine a minimum total air slope so as to avoid a vortex state, and then the minimum total air slope is transformed into a secondary minimum total ground slope. The main symbol then illustrates the main minimum total ground slope when the main minimum total ground slope is greater than the secondary minimum total ground slope, the main symbol illustrating the secondary minimum total ground slope when the main minimum total ground slope is less than the secondary minimum total ground slope.

In a variant, when the longitudinal forward speed of the aircraft is less than a predetermined limit, the main symbol may show the secondary minimum total ground slope. However, when the longitudinal forward speed of the aircraft is greater than or equal to a predetermined limit, the main symbol may show the main minimum total ground slope.

This implementation has the advantage of reducing the risks of the vortex state appearing.

Thus, the manufacturer may perform simulation or flight testing to determine a vortex envelope defined by a curve giving a horizontal air speed of the aircraft as a function of a vertical air speed of the aircraft.

Under such circumstances, the current horizontal air speed in flight is measured, e.g. by using a system known as a low air speed sensor (LOAS).

A limiting vertical air speed is then determined using said curve and said measured current horizontal air speed.

The secondary minimum total ground slope can then be deduced therefrom using the following relationship:

$$\gamma_{airminivortex} = \text{Arcsin}\left( \frac{V_{z\_air\_thresh}}{V_{h\_air}} \right)$$

where "$\gamma_{airminivortex}$" represents the secondary minimum total ground slope, "$V_{z\_air\_thresh}$" represents the limiting vertical air speed, and "$V_{h\_air}$" represents the current horizontal air speed.

It can thus be understood that independently of the implementation, the main symbol is a function of the main minimum total ground slope:

by representing the main minimum total ground slope in the first implementation; and by representing either the main minimum total ground slope or the secondary minimum total ground slope in the second implementation depending on the value of said main minimum total ground slope relative to the value of the secondary minimum total ground slope.

In another aspect, it is possible to show a display unit that shows at least one secondary symbol to be selected from a list including at least one of the following symbols:

a first secondary symbol showing a maximum total ground slope that can be followed by the aircraft when climbing;

a second secondary symbol showing the current ground slope of the aircraft; and a third secondary symbol showing a runway.

In addition to a method, the invention also provides a device implementing the method.

Such a device for assisting the piloting of a hybrid aircraft having a rotary wing and at least one propulsive propeller, is remarkable in particular in that it comprises a calculation unit and a display unit, the calculation unit executing stored instructions to determine at least one thrust margin for the propeller between a current thrust exerted by the propeller and a threshold thrust corresponding to a negative thrust limit authorized on a mechanical transmission driving the propeller;

to determine a main minimum total ground slope that can be followed by the aircraft in descent as a function of the thrust margin; and to present on a display unit a main symbol for the minimum total ground slope that can be followed by the aircraft in descent, this main symbol being a function of at least the main minimum total ground slope and appearing superimposed on a representation of the surrounds existing in front of the aircraft.

The device may have one or more additional characteristics.

Thus, the device may include first means for determining the current forward speed of the aircraft and second means for determining the current power being developed by said propeller, the first and second means being connected to the calculation unit.

By way of example, the first means may comprise a Pitot tube and a static pressure takeoff, the second means possibly implementing means for measuring propeller torque and a sensor for sensing the angular speed of rotation of the propeller.

In addition, the device may include the third means for determining the current ground slope of the aircraft. The third means may comprise a known system such as a global positioning system (GPS) or an inertial navigation system (INS).

In addition, in an embodiment, in order to determine the secondary minimum total ground slope seeking to minimize the risk of a vortex state appearing, said device includes a low speed sensor.

Finally, the invention provides a rotary wing hybrid aircraft having at least one propulsive propeller, the aircraft including a device of the invention.

BRIEF DESCRIPTION OF THE SEVERAL VIEWS OF THE DRAWINGS

The invention and its advantages appear in greater detail from the following description of implementations given by way of illustration with reference to the accompanying figures, in which:

FIG. 1 is a diagram representing an aircraft of the invention;

FIG. 2 is a graph plotting the method of determining a thrust margin; and

FIGS. 3 and 4 are views of the display unit showing different flight configurations.

DETAILED DESCRIPTION OF THE INVENTION

FIG. 1 shows an aircraft 1 having a rotary wing and at least one additional propulsive member, such as a propulsive propeller.

In order to avoid pointlessly cluttering FIG. 1, the FIG. 1 shows only a piloting assistance device 5 of the aircraft.

The device 5 includes a calculation unit 10, which calculation unit may for example be provided with a processor 11 or the equivalent and a memory 12. Under such circumstances, the processor 11 executes instructions stored in the memory 12 in order to implement the piloting assistance method of the invention.

Consequently, the calculation unit determines at least one thrust margin ΔP for each propeller between a current thrust P2 being exerted by the propeller and a threshold thrust P1 corresponding to a negative power limit Pmin predetermined by the manufacturer.

With reference to FIG. 2, the manufacturer may draw up a graph with the thrust exerted by a propeller plotted along the abscissa axis and the power developed by the propeller plotted up the ordinate axis.

The graph then presents a plurality of curves, each curve corresponding to a current forward speed, e.g. a true air speed TAS.

For a given current power W2 and a given current forward speed, it is possible to deduce a current thrust P2. FIG. 2 shows the example of an aircraft having a current forward speed of 200 knots (kts).

Furthermore, the manufacturer establishes a negative power limit Pmin. The point of intersection between a curve associated with a particular forward speed and the negative power limit Pmin serves to establish the threshold power P1 associated with this particular forward speed.

For example, FIG. 2 shows the threshold thrust P1 induced by flying at a current forward speed of 200 kts.

It should be observed that when the aircraft is flying at a current forward speed below a predetermined limit, which limit may be about 80 kts in this example, the negative power limit Pmin cannot be reached.

Using this graph, the manufacturer can establish a first predetermined database giving the current thrust P2 of a propeller as a function of the current forward speed and of the current power W2 of the propeller, and a second predetermined database giving the threshold thrust P1 of the propeller as a function of the current forward speed of the aircraft.

These databases may be in the form of a database as such, or a data file, or of relationships, or of any equivalent means.

With reference to FIG. 1, the calculation unit 10 is then connected both to a first database 13 relating to the current thrust of the propeller and also to a second database 14 relating to the threshold thrust of the propeller.

In addition, the calculation unit 10 is connected to first means 15 for determining the current forward speed of the aircraft, and to second means 16 for determining the current thrust W2 being developed by that propeller.

In order to determine the power margin, the calculation unit 10 communicates with the first means 15 to determine the current forward speed of the aircraft.

Furthermore, the calculation unit 10 communicates with the second means 16 to determine the current power W2 being developed by the propeller.

Consequently, the calculation unit 10 determines the current thrust P2 exerted by the propeller by using the first predetermined database 13, and it determines the threshold thrust P1 by using the second database 14.

From that, the calculation unit 10 deduces the thrust margin ΔP, this thrust margin being equal to the difference between the current thrust P2 and the threshold thrust P1.

Consequently, the calculation unit 10 determines the main minimum total ground slope $\gamma_{min}$ that can be followed by the aircraft in descent by using this thrust margin ΔP.

Advantageously, the calculation unit 10 is also connected to third means 17 for determining the current ground slope γ of the aircraft.

Under such circumstances, the calculation unit 10 determines the main minimum total ground slope by using the following relationship:

$$\gamma_{min} = \gamma - \left(\frac{1}{g} * \frac{1}{m} * \Delta P\right)$$

where "$\gamma_{min}$" represents the main minimum total ground slope, "γ" represents a current ground slope, "g" represents the acceleration due to gravity, "m" represents the mass of the aircraft, and "ΔP" represents said thrust margin.

When the aircraft has a plurality of propellers, the calculation unit 10 may determine the main minimum total ground slope $\gamma_{min}$ for the approach of the aircraft as a function of the smallest thrust margin.

In addition, it should be observed that the calculation unit 10 is connected to a display unit 20 provided with a display screen 23.

The display unit 20 displays a representation 21 of the surroundings outside the aircraft, together with a scale 22 graduated in degrees.

This representation 21 and this scale may be determined in co-operation with the usual means by the display unit 20, or by the calculation unit 10, or indeed by some other unit of the aircraft.

The calculation unit 10 then causes a main symbol 25 to be displayed on the display screen 23 representing the minimum total ground slope that can be followed by the aircraft 1 in descent, the main symbol 25 being superimposed on the representation 21 of the surroundings existing in front of the aircraft.

In a preferred implementation, this main symbol displays the value in degrees of the main minimum total ground slope $\gamma_{min}$.

In an alternative implementation, the calculation unit is also connected to a set of means 18 including a low speed sensor for determining a secondary minimum total ground slope $\gamma'$ seeking to minimize any risk of a vortex state appearing.

In this alternative implementation, the calculation unit 5 determines the secondary minimum total ground slope $\gamma'$ to avoid this vortex state.

Consequently, the main symbol 25 shows the smaller value as selected from the main minimum total ground slope $\gamma_{min}$ and the secondary minimum total ground slope $\gamma'$.

Independently of the implementation, the calculation unit 5 may present at least one secondary symbol on the display unit 20, which symbol may be selected from a list including at least one of the following symbols:

a first secondary symbol 26 showing a maximum total ground slope that can be followed by the aircraft when climbing;

a second secondary symbol 27 showing the current ground slope of the aircraft; and a third secondary symbol 28 showing a landing strip.

With reference to FIG. 1, when the main symbol 25 is situated under the third symbol, it can be understood that the aircraft 1 is capable of reaching the landing strip given the authorized minimum ground slope.

Conversely, with reference to FIG. 3, the main symbol 25 is situated above the third symbol 28. Since the second symbol 27 representing the current ground slope is on the contrary above the main symbol 25, the pilot can reduce the current forward speed in order to reach the landing strip.

Conversely, with reference to FIG. 4, if the second symbol 27 and the main symbol 25 indicates the same value, the pilot has no more margin for reducing forward speed. The pilot must therefore restart the approach in order to reach the runway.

Naturally, the present invention may be subjected to numerous variations as to its implementation. Although several implementations are described above, it will readily be understood that it is not conceivable to identify exhaustively all possible implementations. It is naturally possible to envisage replacing any of the means described by equivalent means without going beyond the ambit of the present invention.

What is claimed is:

1. A method of assisting the piloting of a hybrid aircraft having a rotary wing and at least one propulsive propeller, the method being characterized by the following steps:

determining, by a processor, at least one thrust margin ($\Delta P$) for said propeller between a current thrust (P2) exerted by said propeller and a threshold thrust (P1) corresponding to a negative thrust limit (Pmin) authorized on a mechanical transmission driving the propeller;

determining, by the processor, a main minimum total ground slope ($\gamma_{min}$) that can be followed by the aircraft in descent as a function of said thrust margin ($\Delta P$); and presenting on a display unit a main symbol for the minimum total ground slope that can be followed by the aircraft in descent, this main symbol being a function of at least the main minimum total ground slope ($\gamma_{min}$) and appearing superimposed on a representation of the surroundings existing in front of the aircraft, wherein in order to determine said thrust margin ($\Delta P$), the following steps are performed:

determining a current forward speed of the aircraft;

determining a current power (W2) developed by said propeller;

determining the current thrust (P2) exerted by said propeller by using a first predetermined database giving the current thrust (P2) as a function of said current forward speed and of said current power (W2);

determining said threshold thrust (P1) by using a second predetermined database giving said threshold thrust as a function of said current forward speed; and determining said thrust margin ($\Delta P$), said thrust margin being equal to the difference between the current thrust (P2) and the threshold thrust (P1).

2. The method according to claim 1, wherein the at least one propeller comprises a plurality of propellers, and the step of determining at least one thrust margin comprises determining a plurality of thrust margins with each thrust margin of the plurality of thrust margin being associated with a respective one of the plurality of propellers, and the main minimum total ground slope ($\gamma_{min}$) for the approach of the aircraft is determined as a function of the smallest thrust margin.

3. The method according to claim 1, wherein the step of presenting on a display unit a main symbol comprises illustrating the main minimum total ground slope ($\gamma_{min}$), and not displaying the main symbol when said aircraft has a forward speed slower than a predetermined limit.

4. The method according to claim 1, further comprising determining a minimum total air slope so as to avoid a vortex state, and then transforming said minimum total air slope into a secondary minimum total ground slope ($\gamma'$), with said main symbol illustrating the main minimum total ground slope ($\gamma_{min}$) when said main minimum total ground slope ($\gamma_{min}$) is greater than the secondary minimum total ground slope ($\gamma'$), said main symbol illustrating the secondary minimum total ground slope ($\gamma'$) when said main minimum total ground slope ($\gamma'$) is less than the secondary minimum total ground slope ($\gamma'$).

5. The method according to claim 1, further comprising said display unit showing at least one secondary symbol to be selected from a list including at least one of the following symbols:

a first secondary symbol showing a maximum total ground slope that can be followed by the aircraft when climbing;

a second secondary symbol showing the current ground slope of the aircraft; and a third secondary symbol showing a landing strip.

6. A device for assisting the piloting of a hybrid aircraft having a rotary wing and at least one propulsive propeller, wherein the device comprises a calculation unit and a display unit, the calculation unit executing stored instructions to determine at least one thrust margin ($\Delta P$) for said propeller between a current thrust (P2) exerted by said propeller and a threshold thrust (P1) corresponding to a negative thrust limit (Pmin) authorized on a mechanical transmission driving the propeller;

to determine a main minimum total ground slope ($\gamma_{min}$) that can be followed by the aircraft in descent as a function of said thrust margin ($\Delta P$);

to present on a display unit a main symbol for the minimum total ground slope that can be followed by the aircraft in descent, this main symbol being a function of at least the main minimum total ground slope ($\gamma_{min}$) and appearing superimposed on a representation of the surrounds existing in front of the aircraft; and to determine a minimum total air slope so as to avoid a vortex state, and then to transform said minimum total air slope into a secondary minimum total ground slope ($\gamma'$), with said main symbol illustrating the main minimum total ground slope ($\gamma_{min}$) when said main minimum total ground slope ($\gamma_{min}$) is greater than the secondary minimum total ground slope ($\gamma'$), said main symbol illustrating the secondary minimum total ground slope ($\gamma'$) when said main minimum total ground slope ($\gamma_{min}$) is less than the secondary minimum total ground slope ($\gamma'$).

7. The device according to claim 6, including first means for determining the current forward speed of the aircraft and second means for determining the current power being developed by said propeller, the first and second means being connected to the calculation unit.

8. The device according to claim 6, including third means for determining the current wound slope ($\gamma$) of the aircraft.

9. The device according to claim 6, wherein in order to determine the secondary minimum total ground slope ($\gamma'$) seeking to minimize the risk of a vortex state appearing, said device includes a low speed sensor.

10. A rotary wing hybrid aircraft having at least one propulsive propeller and including a device according to claim 6.

11. A method of assisting the piloting of a hybrid aircraft having a rotary wing and at least one propulsive propeller, the method being characterized by the following steps:

determining, by a processor, at least one thrust margin ($\Delta P$) for said propeller between a current thrust (P2) exerted by said propeller and a threshold thrust (P1) corresponding to a negative thrust limit (Pmin) authorized on a mechanical transmission driving the propeller;

determining, by the processor, a main minimum total ground slope ($\gamma_{min}$) that can be followed by the aircraft in descent as a function of said thrust margin ($\Delta P$); and presenting on a display unit a main symbol for the minimum total ground slope that can be followed by the aircraft in descent, this main symbol being a function of at least the main minimum total ground slope ($\gamma_{min}$) and appearing superimposed on a representation of the surroundings existing in front of the aircraft;

wherein the step of determining a main minimum total ground slope comprises using the following relationship:

$$\gamma_{min} = \gamma - \left(\frac{1}{g} * \frac{1}{m} * \Delta P\right)$$

where "$\gamma_{min}$" represents the main minimum total ground slope, "$\gamma$" represents a current ground slope, "g" represents the acceleration due to gravity, "m" represents the mass of the aircraft, and "$\Delta P$" represents said thrust margin.

12. A method of assisting the piloting of a hybrid aircraft having a rotary wing and at least one propulsive propeller, the method being characterized by the following steps:

determining, by a processor, at least one thrust margin ($\Delta P$) for said propeller between a current thrust (P2) exerted by said propeller and a threshold thrust (P1) corresponding to a negative thrust limit (Pmin) authorized on a mechanical transmission driving the propeller;

determining, by the processor, a main minimum total ground slope ($\gamma_{min}$) that can be followed by the aircraft in descent as a function of said thrust margin ($\Delta P$); and presenting on a display unit a main symbol for the minimum total ground slope that can be followed by the aircraft in descent, this main symbol being a function of at least the main minimum total ground slope ($\gamma_{min}$) and appearing superimposed on a representation of the surroundings existing in front of the aircraft, wherein the at least one propeller comprises a plurality of propellers, and the step of determining at least one thrust margin comprises determining a plurality of thrust margins with each thrust margin of the plurality of thrust margin being associated with a respective one of the plurality of propellers, and the main minimum total ground slope ($\gamma_{min}$) for the approach of the aircraft is determined as a function of the smallest thrust margin.

13. The method according to claim 12, wherein in order to determine said thrust margin ($\Delta P$), the following steps are performed:

determining a current forward speed of the aircraft;

determining a current power (W2) developed by said propeller;

determining the current thrust (P2) exerted by said propeller by using a first predetermined database giving the current thrust (P2) as a function of said current forward speed and of said current power (W2);

determining said threshold thrust (P1) by using a second predetermined database giving said threshold thrust as a function of said current forward speed; and determining said thrust margin ($\Delta P$), said thrust margin being equal to the difference between the current thrust (P2) and the threshold thrust (P1).

14. The method according to claim 12, wherein the step of presenting on a display unit a main symbol comprises illustrating the main minimum total ground slope ($\gamma_{min}$), and not displaying the main symbol when said aircraft has a forward speed slower than a predetermined limit.

15. The method according to claim 12, further comprising determining a minimum total air slope so as to avoid a vortex state, and then transforming said minimum total air slope into a secondary minimum total ground slope ($\gamma'$), with said main symbol illustrating the main minimum total ground slope ($\gamma_{min}$) when said main minimum total ground slope ($\gamma_{min}$) is greater than the secondary minimum total ground slope ($\gamma'$), said main symbol illustrating the secondary minimum total ground slope ($\gamma'$) when said main minimum total ground slope ($\gamma_{min}$) is less than the secondary minimum total ground slope ($\gamma'$).

16. The method according to claim 12, further comprising said display unit showing at least one secondary symbol to be selected from a list including at least one of the following symbols:

a first secondary symbol showing a maximum total ground slope that can be followed by the aircraft when climbing;

a second secondary symbol showing the current ground slope of the aircraft; and a third secondary symbol showing a landing strip.

* * * * *